US009515551B2

(12) United States Patent
Lee et al.

(10) Patent No.: US 9,515,551 B2
(45) Date of Patent: Dec. 6, 2016

(54) SWITCH RELAY DEVICE

(71) Applicant: DAESUNG ELECTRIC CO., LTD, Ansan-si, Gyeonggi-do (KR)

(72) Inventors: Won Ho Lee, Suwon-si (KR); Jong Sub Na, Ansan-si (KR); Dong Woo Lee, Seoul (KR)

(73) Assignee: DAESUNG ELECTRIC CO., LTD, Ansan-Si, Gyeonggi-Do (KR)

( * ) Notice: Subject to any disclaimer, the term of this patent is extended or adjusted under 35 U.S.C. 154(b) by 68 days.

(21) Appl. No.: 14/439,607

(22) PCT Filed: Oct. 29, 2013

(86) PCT No.: PCT/KR2013/009677
§ 371 (c)(1),
(2) Date: Apr. 29, 2015

(87) PCT Pub. No.: WO2014/069873
PCT Pub. Date: May 8, 2014

(65) Prior Publication Data
US 2015/0256070 A1 Sep. 10, 2015

(30) Foreign Application Priority Data

Oct. 31, 2012 (KR) .......................... 10-2012-0122463
Oct. 4, 2013 (KR) .......................... 10-2013-0118689

(51) Int. Cl.
H02H 3/00 (2006.01)
H02M 3/157 (2006.01)
(Continued)

(52) U.S. Cl.
CPC ............. H02M 3/157 (2013.01); H02M 1/32 (2013.01); H02P 27/08 (2013.01)

(58) Field of Classification Search
CPC .... H01H 47/325; H02M 1/32; G06F 2/1022; G06F 1/1635; B23K 9/1087
USPC .................. 363/16–17, 21.12, 21.16, 37, 39; 361/42, 49, 50, 100, 187, 206, 170; 307/24, 64, 66, 77
See application file for complete search history.

(56) References Cited

U.S. PATENT DOCUMENTS 4,910,635 A * 3/1990 Gilliland .............. B23K 9/1087
361/159
5,428,252 A * 6/1995 Walker ...................... G06F 1/30
307/64

(Continued)

FOREIGN PATENT DOCUMENTS

JP 06-216731 A 8/1994
JP 2560532 B2 12/1996

(Continued)

Primary Examiner — Rajnikant Patel
(74) Attorney, Agent, or Firm — Rabin & Berdo, P.C.

(57) ABSTRACT

The present invention relates to a switch relay device, and more particularly, to a switch relay device which is used as an electronic relay that drives electronic components mounted on an automobile. The switch relay device includes: a switching control unit for determining a duty value depending on the kind of a control input signal inputted thereto and generating a first switching control signal and a second switching control signal whose phases are opposite to each other; a switching drive signal generation unit for generating a switching drive signal through R-C charge and discharge in response to the first switching control signal and the second switching control signal applied thereto from the switching control unit; a load output signal generation unit for receiving the switching drive signal from the switching drive signal generation unit and outputting a load output signal; and a constant voltage unit connected to a battery disposed in a vehicle to supply power to the switching drive signal generation unit and the load output signal generation unit and configured to provide a constant voltage to the switching control unit.

16 Claims, 9 Drawing Sheets

(51) Int. Cl.
*H02M 1/32* (2007.01)
*H02P 27/08* (2006.01)

(56) References Cited

U.S. PATENT DOCUMENTS

| | | | | |
|---|---|---|---|---|
| 5,619,127 A | * | 4/1997 | Warizaya | G05F 5/00 323/275 |
| 5,715,154 A | * | 2/1998 | Rault | H02H 9/001 323/908 |
| 8,405,939 B2 | * | 3/2013 | Haines | H02H 9/00 361/42 |
| 2010/0295602 A1 | | 11/2010 | Hoshino et al. | |

FOREIGN PATENT DOCUMENTS

| | | |
|---|---|---|
| JP | 2008-113509 A | 5/2008 |
| KR | 10-0880601 B1 | 1/2009 |
| KR | 10-2009-0102360 A | 9/2009 |
| KR | 10-0920594 B1 | 10/2009 |
| KR | 10-2010-0107034 A | 10/2010 |
| KR | 10-0995485 B1 | 11/2010 |
| KR | 10-2011-0085238 A | 7/2011 |
| KR | 10-1079938 B1 | 11/2011 |
| KR | 10-1165485 B1 | 7/2012 |

* cited by examiner

INPUT PWM

OUTPUT PWM2

OUTPUT PWM1

SWITCH RELAY DEVICE

TECHNICAL FIELD

The present invention relates to a switch relay device, and more particularly, to a switch relay device which is used as an electronic relay that drives electronic components mounted on an automobile.

BACKGROUND ART

Recently, various electrical and electronic components are mounted on an automobile to improve reliability of components and provide a variety of conveniences to users. As such, since the electrical and electronic components have a lot of affirmative aspects, a portion which the electrical and electronic components account for in the automobile is increasing gradually. An electronic relay that is an electronic component exhibits excellent characteristics, such as high reliability, rapid response, miniaturization and compactness, and mechanical non-vibration, and thus will quickly replace a mechanical relay in the near future.

The electronic relay receives a control signal in the form of a direct current (DC) signal or a pulse width modulation (PWM) signal and outputs a switching control signal in the form of a direct current (DC) signal or a pulse width modulation (PWM) signal for application to a load such as a motor. An electronic relay put on the market is implemented as a semiconductor switch in the form of an IC chip (hereafter, referred to as 'semiconductor switch relay IC chip').

The semiconductor switch relay IC chip available on the market entails a problem in that since the IC chip is typically implemented in the form of an integrated IC chip, it has a limitation in being mounted on various loads of a vehicle due to its actually low use current. The semiconductor switch relay IC chip implemented in the form an integrated IC chip must output a current of at least 20 A to 30 A in order to replace an existing mechanical relay that operates a load within a vehicle, but it has a limitation in operating a load such as a motor due to its actually low operating current. In addition, since such a semiconductor switch relay IC chip does not have a microcontroller unit (MCU) (hereinafter, referred to as 'micom') built therein, precise signal detection and various responses according to loads are difficult.

Therefore, in the case where an existing semiconductor switch relay IC chip is used to drive a load such as a motor included in a vehicle, a user suffers from an inconvenience of having to additionally install a separate driving circuit, leading to an increase in the manufacturing cost. Further, since the semiconductor switch relay IC chip does not have a micom built therein, it has a difficulty in controlling the operation and speed of the motor, detect current, and the like.

(Prior Art Patents) Korean Patent Registration No. 10-0995485

DISCLOSURE OF INVENTION

Technical Problem

Accordingly, the present invention has been made to solve the above-mentioned problems occurring in the prior art, and it is an object of the present invention to precisely control a load output signal. Another object of the present invention is to control a load without a separate driving circuit. Still another object of the present invention is to simplify the structure of a circuit that controls a load.

Technical Solution

To achieve the above object, in one aspect, the present invention provides a switch relay device including: a switching control unit for determining a duty value depending on the kind of a control input signal inputted thereto and generating a first switching control signal and a second switching control signal whose phases are opposite to each other; a switching drive signal generation unit for generating a switching drive signal through R-C charge and discharge in response to the first switching control signal and the second switching control signal applied thereto from the switching control unit; a load output signal generation unit for receiving the switching drive signal from the switching drive signal generation unit and outputting a load output signal; and a constant voltage unit connected to a battery disposed in a vehicle to supply power to the switching drive signal generation unit and the load output signal generation unit and configured to provide a constant voltage to the switching control unit.

In the switch relay device, the load output signal generation unit may be implemented as a first FET as a FET device, the first FET including a drain for receiving a power voltage from the battery, a gate for receiving a switching drive signal from the switching drive signal generation unit, and a source for outputting the load output signal to a load.

In the switch relay device, the control input signal inputted to the switching control unit may be any one of a DC signal, a PWM signal, a high signal, and no signal, and the switching control unit may generate the first switching control signal and the second switching control signal whose phases are opposite to each other depending on the input control signal inputted thereto.

In the switch relay device, the switching control unit may separately generate a third switching control signal in the form of a PWM signal, the third switching control signal having a duty value fixed irrespective of the control input signal.

In the switch relay device, if the switching control unit receives a DC control input signal, it may generate a second switching control signal in the form of PWM of a positive phase having a duty value in proportional to a level value of the DC signal, and a first switching control signal in the form of PWM of a negative phase having a duty value in proportional to a level value of the DC signal.

In the switch relay device, if the switching control unit receives a PWM control input signal, it may generate a second switching control signal in the form of PWM of a positive phase having the same duty value as that of the PWM signal, and a first switching control signal in the form of PWM of a negative phase with respect to the PWM signal.

In the switch relay device, if the switching control unit receives a high control input signal, it may generate a second switching control signal having a high value of "1" and a first switching control signal having a low value of "0".

In the switch relay device, in case of a 'no signal' state where no control input signal is inputted to the switching control unit for a given time period, the switching control unit may perform a switching operation in which between the constant voltage unit and the switching control unit is opened to cause the operation of the constant voltage unit to be stopped.

In the switch relay device, the switching drive signal generation unit may include: a first charge and discharge module for receiving the power voltage from the battery, the first charge and discharge module being an integration circuit consisting of a first resistor R1 and a first capacitor C1; a first diode D1 disposed between the first charge and discharge module and the battery; a first switch for switching on/off whether to discharge the switching drive signal inputted to the gate of the first FET in response to the first switching control signal inputted thereto from the switching control unit; a second switch for receiving a second switching control signal having a phase opposite to that of the first switching control signal from the switching control unit and performing a switching on/off operation in the opposite manner to that of the first switch in response to the second switching control signal; and a load output drive signal on/off module for adjusting a time constant of the first charge and discharge module to control the output of the first FET of the load output signal generation unit.

In the switch relay device, the load output drive signal on/off module may include: a second FET comprising a source that is connected to the source of the first FET, a gate that receives the third switching control signal from the switching control unit, and a drain that is connected to the other end of the first charge and discharge module; and a third FET comprising a drain that is connected to a node between the other end of the first charge and discharge module and the drain of the second FET, a gate that receives the third switching control signal from the switching control unit, and a source that is connected to a ground.

In the switch relay device, the switching drive signal generation unit may further include: a second charge and discharge module implemented as an integration circuit that is connected at one end thereof to a node between the first diode D1 and the first charge and discharge module and is connected at the other end thereof to the gate of the first FET, and consists of a second resistor R2 and a second capacitor C2 that are connected in parallel with each other; and a fifth diode that is disposed between the node between the first charge and discharge module and the first diode D1 and the gate of the first FET Q1, the fifth diode having an anode connected to the node between the first diode and the first charge and discharge module and a cathode connected to the second charge and discharge module, wherein the load output drive signal on/off module may adjust a time constant of the second charge and discharge module along with the adjustment of the time constant of the first charge and discharge module to control the output of the first FET of the load output signal generation unit.

In a preferred embodiment, the switch relay device may further include: an overcurrent monitoring module for monitoring a voltage to be applied to the switching control unit, and detecting whether or not an overcurrent exceeding a predetermined range flows into the switching control unit; a surrounding state monitoring module for monitoring the supply voltage of the battery, the surrounding temperature, and the control input signal; and an input and output monitoring module for monitoring whether a difference between the control input signal and the load output signal is within a normal range.

In the switch relay device, the overcurrent monitoring module may include: a shunt resistor disposed between the drain as an input terminal of the first FET and the battery; a current detector for detecting a current flowing in the shunt resistor; and a low pass filter for filtering the current detected by the current detector and providing the filtered current to the switching control unit.

In the switch relay device, the current detector may compensate a value of the current detected by the shunt resistor using the measured surrounding temperature.

In the switch relay device, the low pass filter may include: a first low pass filter having a predetermined maximum current value as a first filtering reference value; and a second low pass filter having a predetermined overcurrent value as a second filtering reference value.

In the switch relay device, if a value of the current detected by the current detector is a current value exceeding the first filtering reference value and the second filtering reference value, the switching control unit may generate the first switching control signal and the second switching control signal as error pulse signals to output them.

Advantageous Effects

The switch relay device according to the embodiment of the present invention having the configuration as described above have the following advantageous effects.

A plurality of switching control signals is generated depending on the kind of the control input signal, so that a precise control of the load output signal can be performed. In addition, a load can be driven using a pulse width modulation (PWM) scheme or a self-drive scheme even without additionally providing a separate circuit by adopting a micom, thereby reducing the manufacturing cost. Further, overvoltage and overcurrent can be precisely detected and controlled unlike an existing relay, thereby ensuring so that the lifespan and stability of a variety of kinds of loads. Since the inventive switch relay device employs a non-contact scheme, there is no noise and friction so that the lifespan of the relay itself can be extended semi-permanently. In addition, a deviation of the resistance value of the shunt resistor according to the temperature can be compensated to increase a precision of the current measurement. Moreover, if there is no control input signal inputted to the switching control unit for a given time period, the switching control unit enters a power saving mode so that unnecessary power consumption of the battery can be prevented. Besides, when the temperature coefficient compensation is performed at two different temperatures, the current measurement can be more precisely carried out. Pulse signals with various patterns are outputted for the purpose of a load protection and a self-circuit protection under the conditions such as overvoltage, overcurrent, high temperature and the like so that the output voltage can be stably controlled. As such, when a precise control conforming to the load is performed, the necessity of a separate driving circuit used in an existing relay is eliminated.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Now, preferred embodiments of a semiconductor power switch for a vehicle according to the present invention will be described hereinafter in detail with reference to the accompanying drawings. However, the present invention is not limited to embodiments disclosed below, but may be implemented in various different form. Embodiments are provided only for illustrative purposes and for full understanding of the scope of the present invention by those skilled in the art.

Figure 1:
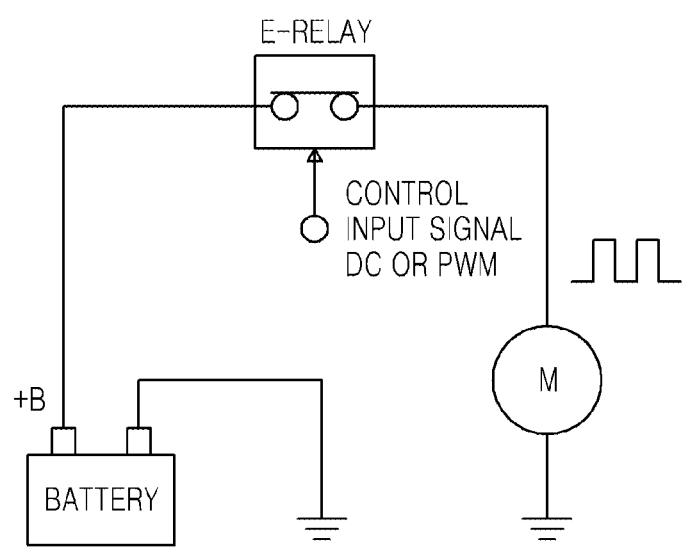
FIG. 1 is a diagrammatic view illustrating a device that drives a load such as a motor (M) using an electronic relay (E-Relay) according to an embodiment of the present invention.

FIG. 1 is a diagrammatic view illustrating a device that drives a load such as a motor (M) using an electronic relay (E-Relay) according to an embodiment of the present invention.

An electronic relay (E-Relay) receives a control input signal DC or PWM in the form of a direct current (DC) signal or a pulse width modulation (PWM) signal, and outputs a PWM or DC load output signal. That is, the electronic relay (E-Relay) receives the control input signal and outputs PWM or DC load output signal for application to a motor M as a load. The motor is driven in response to the load output signal applied thereto.

In the embodiment of the present invention, in allowing the electronic relay to output the DC or PWM load output signal, a plurality of switching control signals are produced using a microcontroller unit (MCU) (hereinafter, referred to as 'micom') to output a precise load output signal. In addition, load output signals according to various errors are outputted through the monitoring of an overcurrent, a surrounding state, and input and output signals. To this end, the electronic relay is implemented as a semiconductor switch in the embodiment of the present invention. The switch type electronic relay according to the embodiment of the present invention is hereinafter referred to as a switch relay device. The switch relay device can be implemented as a single IC semiconductor chip, and may be implemented as another circuit means.

Figure 2:
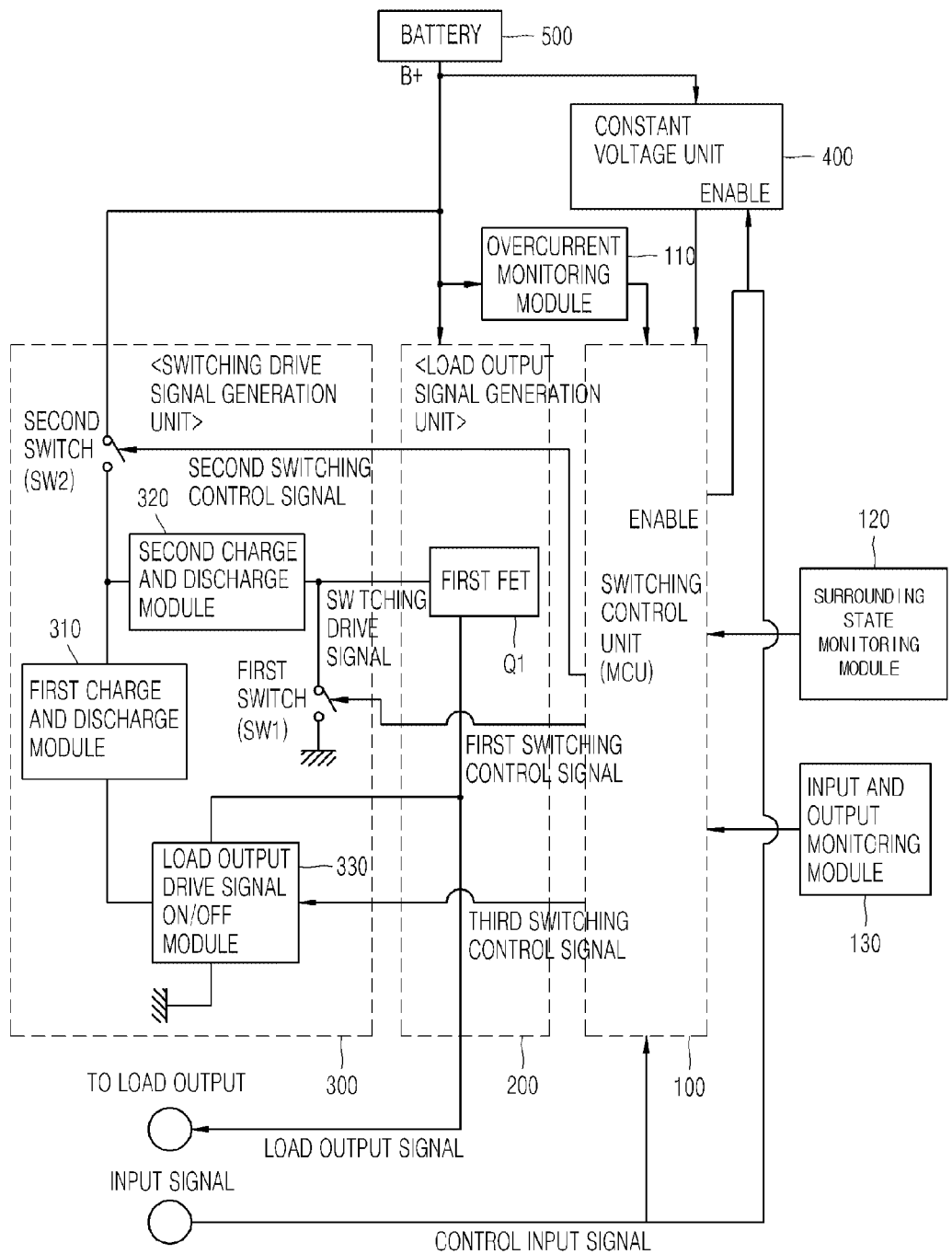
FIG. 2 is a conceptual block diagram illustrating a switch relay device according to an embodiment of the present invention.
Figure 3:
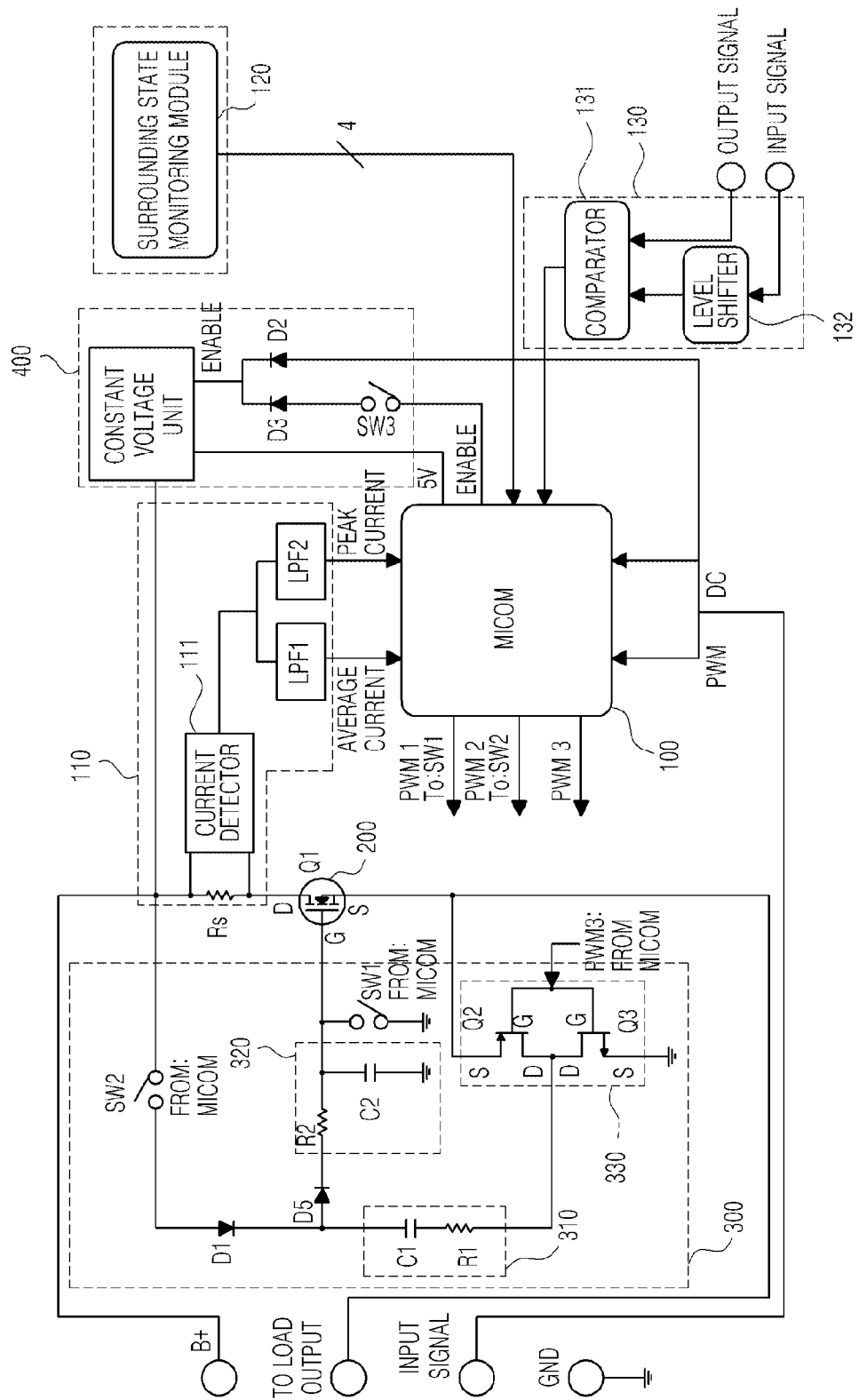
FIG. 3 is a circuit diagram illustrating a semiconductor switch relay device according to an embodiment of the present invention.

FIG. 2 is a conceptual block diagram illustrating a switch relay device according to an embodiment of the present invention, and FIG. 3 is a circuit diagram illustrating a semiconductor switch relay device according to an embodiment of the present invention.

The switch relay device includes a switching control unit 100, a load output signal generation unit 200, a switching drive signal generation unit 300, and a constant voltage unit 400. The load output signal generation unit 200, the switching drive signal generation unit 300, and the constant voltage unit 400 receive electric power from a battery 500 of a vehicle.

The constant voltage unit 400 receives power from the battery 500 of the vehicle and generates a constant voltage for application to the switching control unit 100. For example, the constant voltage unit 400 is supplied with a power voltage (e.g., 12V) from the battery 500, and converts the power voltage into a constant voltage (e.g., 5V) for application to the switching control unit 100. In addition, the constant voltage unit 400 includes an enable terminal so that when a signal is inputted to the enable terminal, the constant voltage unit is driven to be switched on, whereas the constant voltage unit is driven to be switched off when an enable signal is not inputted to the enable terminal. Further, the constant voltage unit 400 includes a third switch SW3 that is disposed between the enable terminal of the constant voltage unit and an enable terminal of the switching control unit to interconnect the enable terminal of the constant voltage unit and the enable terminal of the switching control unit. The switching control unit 100 determines whether or not an enable signal thereof is applied to the enable terminal of the constant voltage unit depending on the on/off operation of the third switch. The third switch SW3 is controlled by the switching control unit 100. If there is no a control input signal applied to the switching control unit 100 for a given time period, the switching control unit 100 turns off the third switch SW3 to stop the operation of the constant voltage unit 400. The operation of the constant voltage unit 400 is stopped to cause the constant voltage of constant voltage unit 400 to stop the operation of the switching control unit 100, ultimately to stop the operations of the load output signal generation unit 200 and the switching drive signal generation unit 300, so that unnecessary power consumption of the battery can be significantly reduced.

The constant voltage unit 400 is configured such that it directly receives the control input signal through the enable terminal thereof in parallel with the third switch SW3, so that when the control input signal is again applied thereto normally, the constant voltage unit 400 can be driven again normally.

The load output signal generation unit 200 receives a switching drive signal from the switching drive signal generation unit 300 and outputs a PWM load output signal for application to a load such as a motor.

The load output signal generation unit 200 can be implemented as various switching devices. As shown in FIG. 3, if the switching device is implemented as a first FET Q1 as a field effect transistor (FET), a drain D of the first FET is used as an input terminal so as to be connected to the battery 500, a gate G of the first FET is used as a control terminal so as to receive a switching drive signal from the switching drive signal generation unit 300, and a source of the first FET is used as an output terminal so as to generate a load output signal for application to a load such as a motor included in a vehicle.

The switching control unit 100 determines a duty value depending on the kind of the control input signal and generates a first switching control signal and a second switching control signal whose phases are opposite to each other. To this end, the switching control unit 100 is implemented as a micom that enables calculation and analysis such as a micro controller unit (MCU).

The control input signal that can be inputted to the switching control unit 100 includes the following four signals: a DC signal, a PWM signal, a high signal, and no signal. The switching control unit 100 outputs the first switching control signal and the second switching control signal that are different in duty values and phase values from each other depending on each control input signal. In the case where there is a control input signal inputted to the switching control unit 100, if the switching control unit 100 determines the control input signal is the DC signal through analysis, it outputs a switching control signal after adjusting a PWM duty value of the switching control signal depending on a voltage level value. On the other hand, if the switching control unit 100 determines the control input signal is the PWM signal, it outputs a switching control signal having the same PWM duty value as that of the switching control signal. In addition, if the switching control unit 100 determines the control input signal is the high signal, it outputs the same high signal as the high signal or a low signal as the switching control signal, which will be described hereinafter.

The DC signal is a signal having a DC voltage value with a constant level, and the switching control unit generates a switching control signal having a different PWM duty value depending on a level value of the DC signal. As the level value of the DC signal is larger, the switching control unit outputs a PWM signal having a larger duty value as the switching control signal. In addition, the switching control unit outputs a plurality of switching control signals such that respective switching control signals are different from each other depending on the input control signal.

The operation of outputting the switching control signal from the switching control unit will be described hereinafter in detail with reference to FIG. 4.

Figure 4:
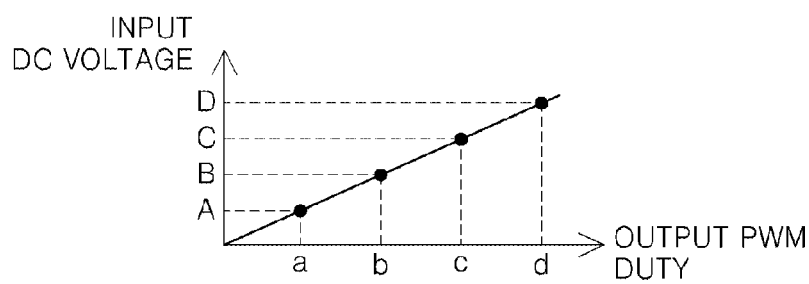
FIG. 4 is a graph illustrating an example of a switching control signal having different duty values according to a DC control input signal according to an embodiment of the present invention.
Figure 4:
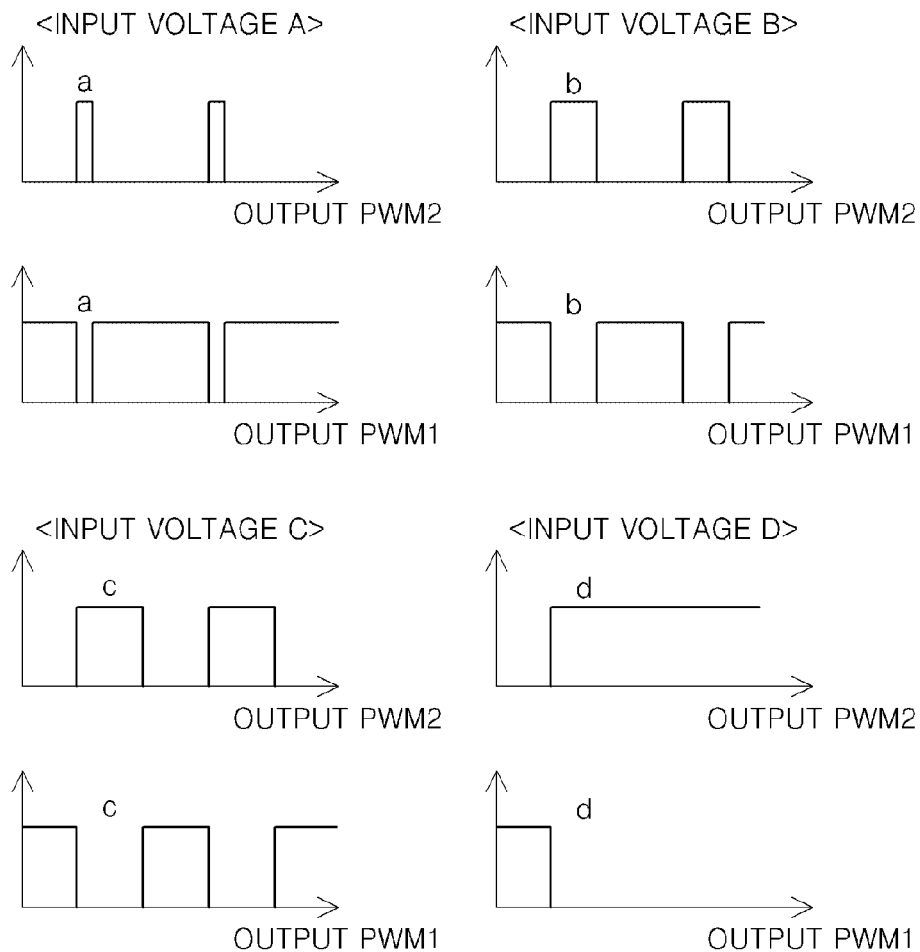

FIG. 4 is a graph illustrating an example of a switching control signal having different duty values according to a DC control input signal according to an embodiment of the present invention. FIG. 4(*a*) is a graph illustrating a duty value of the switching control signal according to a DC level value of the control input signal, and FIG. 4(*b*) is a graph illustrating a switching control signal (PWM) employing a duty value according to a DC level value of the control input signal.

Referring to FIG. 4, if a level of an input DC voltage is 'A', the switching control unit 100 outputs a second switching control signal (output PWM2) in the form of PWM of a positive phase having a duty value (output PWM Duty) of a width 'a' to a second switch of the switching drive signal generation unit 300, and outputs a first switching control signal (output PWM1) of a negative phase to a first switch of the switching drive signal generation unit 300. In addition, as can be seen from FIG. 4, a level of an input DC voltage is 'B' larger than 'A', the switching control unit 100 outputs a second switching control signal (output PWM2) in the form of PWM of a positive phase having a duty value of a width 'b' larger than a width 'a' to the second switch of the switching drive signal generation unit 300, and outputs a first switching control signal (output PWM1) of a negative phase to the first switch of the switching drive signal generation unit 300. Likewise, as can be seen from FIG. 4, a level of an input DC voltage is 'C' larger than 'B', the switching control unit 100 outputs a second switching control signal (output PWM2) in the form of PWM of a positive phase having a duty value of a width 'c' larger than a width 'b' to the second switch of the switching drive signal generation unit 300, and outputs a first switching control signal (output PWM1) of a negative phase to the first switch of the switching drive signal generation unit 300. In addition, as can be seen from FIG. 4, a level of an input DC voltage is 'D' larger than 'C', the switching control unit 100 outputs a second switching control signal (output PWM2) in the form of PWM of a positive phase having a duty value of a width 'd' larger than a width 'c' to the second switch of the switching drive signal generation unit 300.

Figure 5:
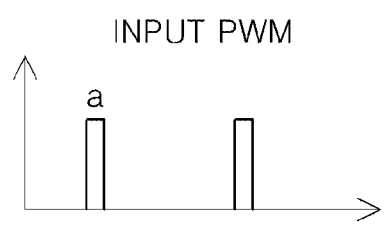
FIG. 5 is a waveform diagram illustrating an example of a switching control signal outputted in response to a PWM control input signal according to an embodiment of the present invention.
Figure 5:
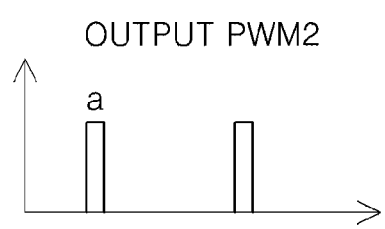
Figure 5:
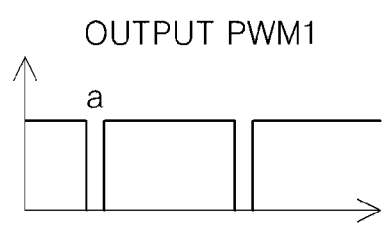

If a PWM signal as a control input signal is inputted to the switching control unit 100, the switching control unit 100 outputs a switching control signal having the same duty value as that of the control input signal. In other words, as shown in FIG. 5, If a control input signal (input PWM) having a duty value of a width 'a' is inputted to the switching control unit 100, the switching control unit 100 outputs a second switching control signal (output PWM2) in the form of PWM of a positive phase having the same duty value (output PWM Duty) as that of a width 'a' to the second switch of the switching drive signal generation unit 300, and simultaneously outputs a first switching control signal (output PWM1) in the form of PWM of a negative phase to the first switch of the switching drive signal generation unit 300.

Figure 6:
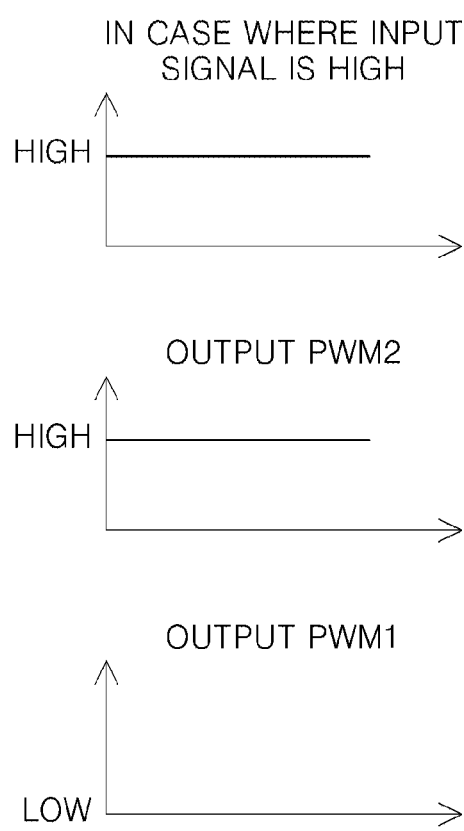
FIG. 6 is a waveform diagram illustrating an example of a switching control signal outputted in response to a high control input signal according to an embodiment of the present invention.

If the control input signal has a predetermined DC level value (for example, DC value of "1"), the switching control unit 100 recognizes the control input signal as a high signal and outputs a second switching control signal (output PWM2) having a high value to the second switch of the switching drive signal generation unit 300, and simultaneously outputs a first switching control signal (output PWM1) having a low value of "0" to the first switch of the switching drive signal generation unit 300 as shown in FIG. 6. In case of a 'no signal' state where no control input signal is inputted to the switching control unit 100 for a given time period, the switching control unit 100 turns off the third switch SW3 to perform a switching operation in which between the constant voltage unit 400 and the switching control unit 100 is opened to cause the operation of the constant voltage unit to be stopped. When there is no control input signal inputted to the switching control unit 100, the switching control unit 100 controls the constant voltage unit 400 to be disabled so that the unnecessary power consumption of the battery can be prevented. If a control input signal is again inputted to the switching control unit 100, the constant voltage unit 400 is enabled to supply a constant voltage of 5V to the switching control unit 100.

In the meantime, the switching control unit 100 outputs a third switching control signal (output PWM3) in the form of PWM, which has a separate fixed duty value besides the first switching control signal and the second switching control signal, which has been described above. The third switching control signal, which is a PWM signal having a fixed duty value without being affected by the control input signal, is supplied to a load output drive signal on/off module 330. The third switching control signal is used for R-C charge and discharge, i.e., charge or discharge of a first charge and discharge module 310 and a second charge and discharge module 320.

As described above, the switching control unit 100 outputs first and second switching control signal which are different in phase from each other depending on the kind of the control input signal, i.e., a DC signal, a PWM signal, and a high signal. To this end, the switching control unit 100 is required to analyze and grasp the pattern of the control input signal inputted thereto for a predetermined time period. For this purpose, the switching control unit is preferably implemented as a microcontroller unit (MCU) (hereinafter, referred to as a 'micom') enabling calculation.

Meanwhile, the switching drive signal generation unit 300 includes a first switch SW1, a second switch SW2, a load output drive signal on/off module 330, a first charge and discharge module 310, and a first diode D1. The switching drive signal generation unit 300 may further include a second charge and discharge module 320 and a fifth diode D5, if necessary.

The first switch SW1 switches on/off whether to discharge a switching drive signal inputted to a gate of the first FET Q1 of the load output signal generation unit 200 in response to a first switching control signal inputted thereto from the switching control unit 100. The first switch SW1 is a switch that is switched on (i.e., short-circuited) when the input signal is high. The first switch SW1 receives a first switching control signal in the form of PWM from the switching control unit 100 and is switched on/off (i.e., short-circuited/opened) in response to the first switching control signal. The first switch SW1 is connected at one end thereof to the gate of a control terminal of the first FET Q1 of the load output signal generation unit 200, and is connected at the other end thereof to the ground GND. When the first switch SW1 is switched on (i.e., short-circuited), the PWM switching drive signal inputted to the control terminal (i.e., gate) of the first FET Q1 flows to the ground so that the first switch SW1 serves as a discharge circuit.

The second switch SW2 receives a second switching control signal having a phase opposite to that of the first switching control signal from the switching control unit 100 and is switched on/off in the opposite manner to that of the first switch SW1 in response to the second switching control signal to supply/cut off a power voltage from the battery.

The second switch SW2 also is a switch that is switched on (i.e., short-circuited) when the input signal is high. The second switch SW2 receives a second switching control signal in the form of PWM from the switching control unit 100 and is switched on/off (i.e., short-circuited/opened) in response to the second switching control signal. Referring to FIG. 4 or 6, it can be seen that the first switching control signal (output PWM1) and the second switching control signal (output PWM2) have different phases that are opposite to each other. Thus, the second switch SW2 is driven in the opposite manner to that of the first switch SW1, so that a loss of current can be prevented. If the first switch SW1 that receives the first switching control signal is switched on, current flows in the elements such as the first diode D1, a second resistor R2, and a second capacitor C2 to cause a loss of current. In this case, if the second switching control signal having the opposite phase to that of the first switching control signal is supplied to the second switch SW2 to cause the second switch to be switched off to cut off the supply of the power, so that a loss of current can be prevented.

The load output drive signal on/off module 330 adjusts a time constant (i.e., R-C time constant) of the first charge and discharge module 310 to control the output of the first FET Q1 of the load output signal generation unit 200. If the switching drive signal generation unit 300 further includes the second charge and discharge module 320, the load output drive signal on/off module 330 can also adjust a time constant (i.e., R-C time constant) of the second charge and discharge module 320 together with the adjustment of the time constant of the first charge and discharge module 310 to control the output of the first FET Q1 of the load output signal generation unit 200. In this embodiment, it will be described hereinafter that the switching drive signal generation unit 300 includes the first charge and discharge module 310 and the second charge and discharge module 320. The load output drive signal on/off module 330 adjusts a charge and discharge time constant of the first charge and discharge module 310 and the second charge and discharge module 320 to adjust the on/off drive of the first FET Q1 of the load output signal generation unit 200. The load output drive signal on/off module 330 includes a second FET Q2 and a third FET Q3 that are connected in series, so that the second FET Q2 and the third FET Q3 receive a third switching control signal simultaneously from the switching control unit 100.

The second FET Q2 has a source S connected to the source of the first FET Q1 and a drain D connected to a node between the first charge and discharge module 310 and a drain of the third FET Q3. In addition, the second FET Q2 has a gate G that receives the third switching control signal from the switching control unit 100. The third FET Q3 has a drain D connected to a node between the other end of the first charge and discharge module 310 and the drain of the second FET Q2, and a source S connected to the ground GND. In addition, the third FET Q3 has a gate G that receives the third switching control signal from the switching control unit 100.

Thus, the second and third FETs Q2 and Q3 receives the third switching control signal in the form PWM from the switching control unit 100 through each of the gates thereof, and synchronizes a load output signal outputted from the source of the first FET Q1 of the load output signal generation unit 200 with a charge and discharge cycle of the first and second charge and discharge modules 310 and 320 to cause the load output signal to normally flow to the load such as the motor or to flow to the ground, so that the output of the first FET Q1 can be precisely controlled.

The first charge and discharge module 310 that receives a power voltage from the battery 500 is an integration circuit consisting of a first resistor R1 and a first capacitor C1, which are connected in series. The first charge and discharge module 310 is an integration circuit for generating a switching drive signal that operates the gate of the first FET Q1 of the load output signal generation unit 200. The charge or discharge of the first capacitor C1 of the first charge and discharge module 310 is performed by the switching operation of the third FET Q3. The first capacitor C1 of the first charge and discharge module 310 is connected at one end thereof to the battery 500 side. But, in this embodiment, the first capacitor C1 is connected at one end thereof to the first diode D1, and is connected at the other end thereof to the first resistor R1. The first resistor R1 is connected at one end thereof to the first capacitor C1 and is connected at the other end thereof to the load output drive signal on/off module 330.

The first diode D1 is disposed between the first charge and discharge module 310 and the battery 500. In this embodiment, more specifically, the first diode D1 is disposed between a node between the first charge and discharge module 310 and the second charge and discharge module 320 and the battery 500. An anode of the first diode D1 is connected to the battery 500 side, and more specifically, to the second switch SW2, and a cathode of the first diode D1 is connected to the node between first charge and discharge module 310 and the second charge and discharge module 320.

The second charge and discharge module 320 is implemented as an integration circuit that is connected at one end thereof to a node between the first diode D1 and the first charge and discharge module 310 and is connected at the other end thereof to the gate of the first FET Q1, and consists of a second resistor R2 and a second capacitor C2 that are connected in parallel with each other. In other words, the second charge and discharge module 320 is an integration circuit for generating a switching drive signal that operates the gate of the first FET Q1 of the load output signal generation unit 200, and includes the second resistor R2 and the second capacitor C2 that are connected in parallel with each other. The second resistor R2 is connected at one end thereof to the node between the first diode D1 and the first charge and discharge module 310 and is connected at the other end thereof to the gate of the first FET Q1 of the load output signal generation unit 200. The second capacitor C2 is connected at one end thereof to a node between the second resistor R2 and the gate of the first FET Q1 and is connected at the other end thereof to the ground GND. In other words, in the case where the switching drive signal generation unit 300 includes the second charge and discharge module 320, the second charge and discharge module 320 generates the switching drive signal that operates the gate of the first FET Q1 together with the first charge and discharge module 310.

In addition, the switching drive signal generation unit 300 may further include a fifth diode D5 disposed between the battery 500 and the second resistor R2. The fifth diode D5 is disposed between the battery 500 and the second resistor R2, i.e., between the first charge and discharge module 310 and the second charge and discharge module 320, more specifically, between the node between the battery 500 and the first charge and discharge module 310 and the second charge and discharge module 320. An anode of the fifth diode D5 is connected to the node between the first charge and discharge module 310 and the battery 500, more specifically, to the node between the first charge and discharge module 310 and the first diode D1. A cathode of the fifth diode D5 is connected to the second resistor R2 of the second charge and discharge module 320. In the case where the switching drive signal generation unit 300 includes the second charge and discharge module 320, the charge operation of the first capacitor C1 by the conduction of the second FET Q2 through the fifth diode D5 is the same, but it is possible to prevent partial discharge of a voltage of the second charge and discharge module 320 consisting of the second resistor R2 and the second capacitor C2 through the first capacitor C1 during the conduction of the third FET Q3. In addition, a voltage of the integration circuit consisting of the second resistor R2 and the second capacitor C2 is prevented from being partially discharged, thereby ensuring the more rapid voltage boosting speed than in case of excluding the fifth diode D5 and enabling the same operation even though a time constant of the second resistor R2 and the second capacitor C2 is small.

Hereinafter, an operation will be described in which the switching drive signal generation unit 300 including the first switch, the second switch, the load output drive signal on/off module, the first charge and discharge module, and the second charge and discharge module precisely outputs the load output signal in response to the switching control signal.

When the first switch SW1 is switched off, the charge and discharge is performed by a high signal and a low signal of a pulse waveform, outputted from the drain of the second FET Q2 and the drain of the third FET Q3, so that a voltage applied between the gate and the source of the first FET Q1 is maintained through the second resistor R2 and the second capacitor C2 of the integration circuit. In this state, when the first switch SW1 is again switched on, the voltage between the gate and the source of the first FET Q1 is discharged through the first switch SW1, so that the first FET Q1 is switched off to cut off the output of the load output signal.

Thus, when the first switch SW1 is switched off, the first FET Q1 has a given delay time and is switched on so that power can be supplied to the load without any occurrence of an excessive inrush current or a surge voltage in the load. For reference, if the first switch SW1 is switched off, the first FET Q1 is switched on to cause the load output signal to be applied to the load. If the first switch SW1 is switched on, a discharge circuit is configured between the gate and the source of the first FET Q1, so that when a voltage charged in the first FET is discharged, the first FET is switched off.

As described above, since the switch relay device of the present invention is configured to receive the control input signal and precisely control the output of the load output signal in response to the control input signal, it is very important to correctly process the control input signal. Thus, the switching control unit includes a function of determining whether the control input signal is a PWM signal or a DC signal or whether or not there is a control input signal applied to the switching control unit.

Besides, in the embodiment of the present invention, the switching control unit 100 includes an overcurrent monitoring module 110, a surrounding state monitoring module 120, an input and output monitoring module 130 so as to prevent an erroneous operation of the switch relay device.

The overcurrent monitoring module 110 performs a function to stabilize current by detecting whether or not an overcurrent flows into the switching control unit and controlling the output in order to stably control the current of the load output signal. The overcurrent monitoring module monitors a voltage being applied from a current detector to the switching control unit, and detects whether or not an overcurrent exceeding a predetermined range flows into the switching control unit. The overcurrent monitoring module includes a shunt resistor, a current detector, and a low pass filter (LPF).

The shunt resistor Rs is a resistor that has a precise resistance value used to detect current, and is disposed between the drain as an input terminal of the first FET Q1 and the battery 500.

The current detector 111 performs a function of detecting the current flowing into the drain as the input terminal of the first FET Q1. The current detector 111 can measure a voltage across the shunt resistor Rs disposed between the drain as the input terminal of the first FET Q1 and the battery 500 to measure the current flowing into the drain of input terminal of the first FET Q1.

The low pass filter (LPF) is a filter that filters the current detected by the current detector and provides the filtered current to the switching control unit 100. The low pass filter includes a first low pass filter LPF1 and a second low pass filter LPF2 that are connected in parallel with each other. The first low pass filter LPF1 is a filter that filters the current using a maximum current value as a limit value when a general current flows. That is, the first low pass filter LPF1 has a predetermined maximum current value as a first filtering reference value, so that it allows a detected current value that does not exceed the predetermined maximum current value (i.e., first filtering reference value) to pass therethrough and does not allow a detected current value exceeding the predetermined maximum current value (i.e., first filtering reference value) to pass therethrough.

The second low pass filter is a filter that is used to detect an overcurrent flowing into the switching control unit. That is, the second low pass filter has a predetermined overcurrent value as a second filtering reference value, so that it allows a detected current value that does not exceed the predetermined overcurrent value (i.e., second filtering reference value) to pass therethrough and does not allow a detected current value exceeding the predetermined overcurrent value (i.e., second filtering reference value) to pass therethrough. The first and second low pass filters are respectively used to filter the maximum current and the overcurrent by separating the current into a maximum current (i.e., peak current) value and an overcurrent (i.e., over current) value so as to be provided to the switching control unit so that an instantaneous maximum current or overcurrent can be detected to respond to the short-circuit in case of the current.

Figure 7:
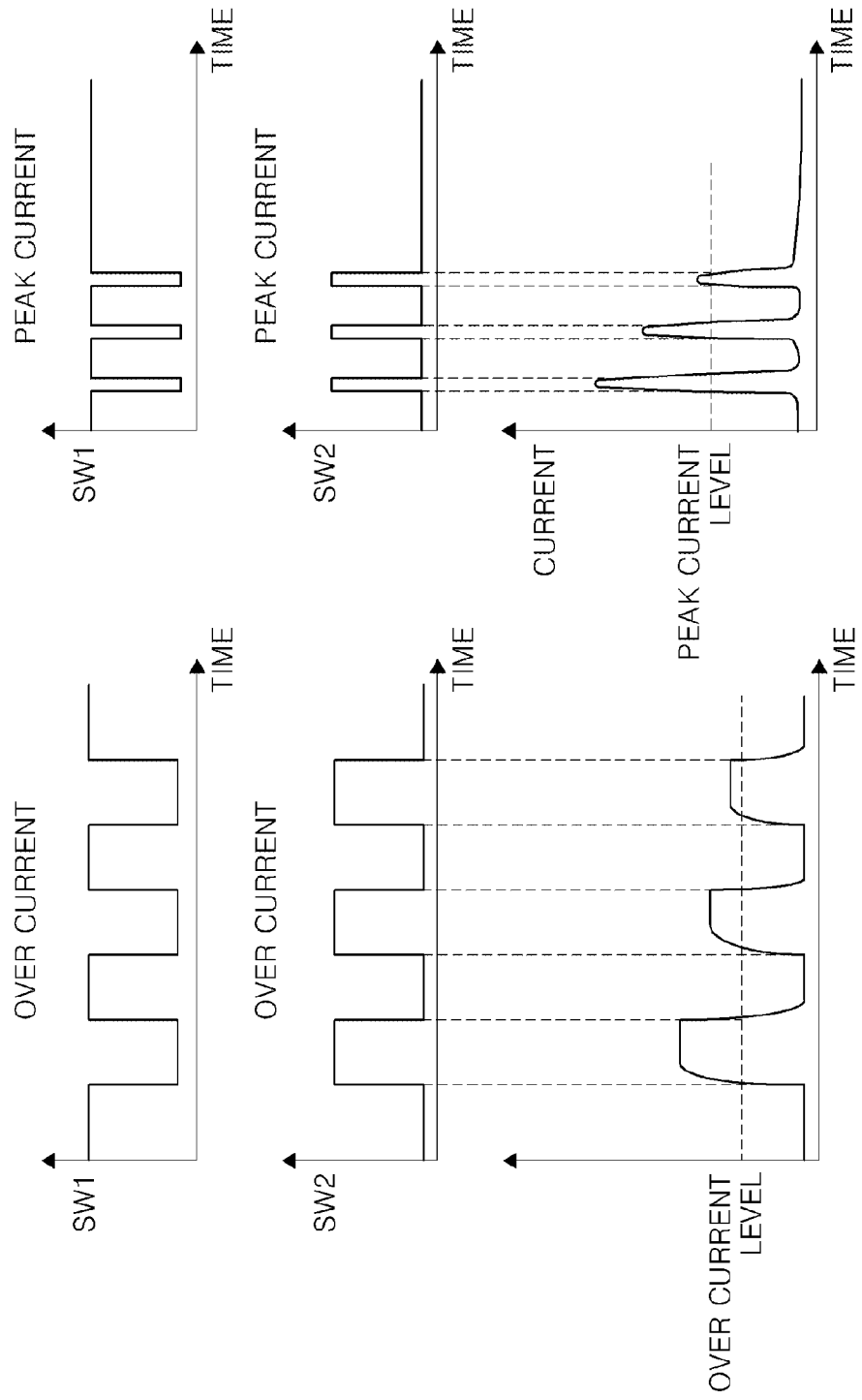
FIG. 7 is a timing chart illustrating a detected current (detection current) that exceeds an overcurrent and a maximum current according to an embodiment of the present invention.

If the current value detected by the current detector is a current value exceeding the first filtering reference value and the second filtering reference value, the switching control unit generates the first switching control signal and the second switching control signal as error pulse signals and outputs them. That is, if the current value detected by the current detector exceeds the overcurrent level or the maximum current level (i.e., peak current level) as shown in FIG. 7 depending on two current values inputted to the switching control unit from the first and second low pass filters, the switching control unit enters an error mode so that it does not output the first switching control signal and the second switching control signal in the form of a general PWM signal, but outputs an error pulse signal indicating an error mode. Thus, when an overcurrent or maximum current error occurs, the switching control unit provides an on/off error pulse signal to the first switch SW1 and the second switch SW2, so that the current applied to the input terminal of the first FET can be maintained in a specific level or less, thereby achieving stabilization of the current.

Figure 8:
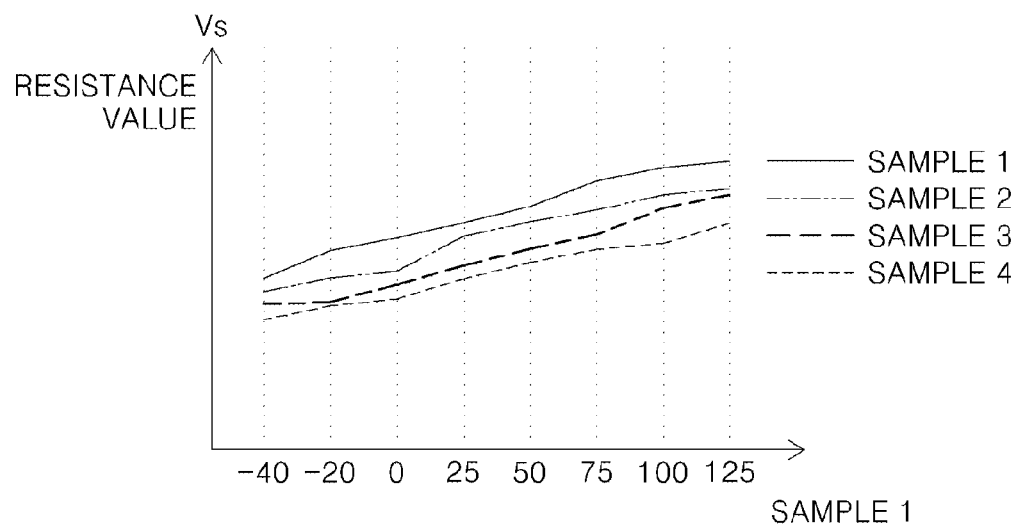
FIG. 8 is a graph illustrating a deviation of a resistance value of a shunt resistor according to a temperature.
Figure 8:
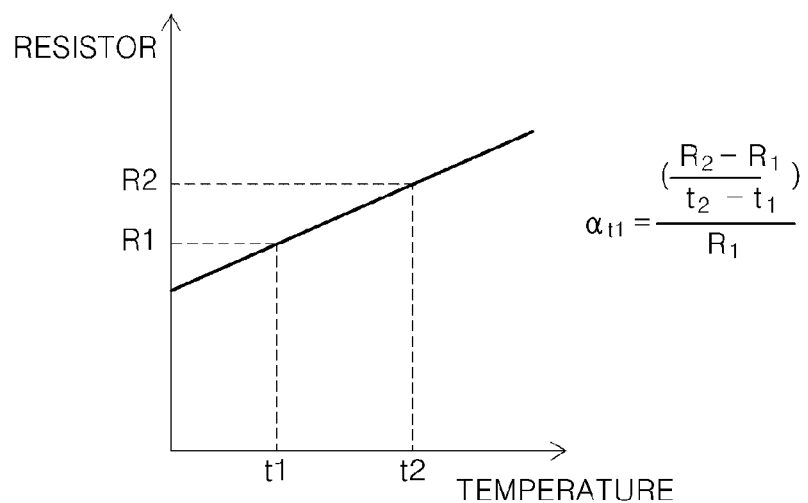
Figure 9:
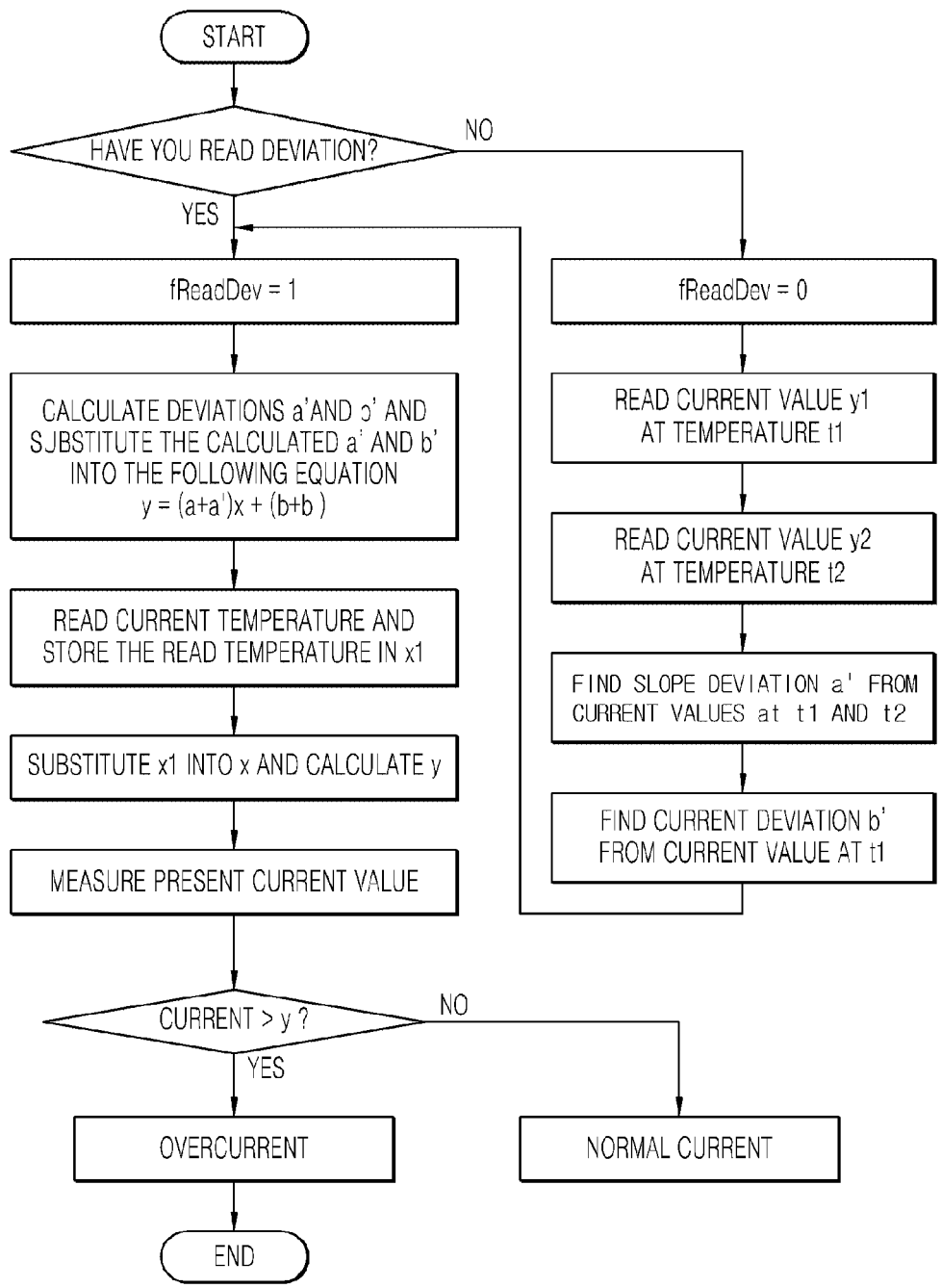
FIG. 9 is a flowchart illustrating a process of compensating a detected current value measured by a shunt resistor according to an embodiment of the present invention.

In the meantime, after the current is measured using the shunt resistor Rs, both the self error compensation and the compensation of a deviation of a temperature coefficient are required to be performed. As shown in FIG. 8, since the shunt resistor has its own deviation and has a relationship in which its resistance value is proportional to the temperature, the resistance value of the shunt resistor is compensated using the principle. The compensation process of the shunt resistor is shown in FIG. 9. The relationship between the resistance value of the shunt resistor and the temperature can be written by the following linear function equation: Y=ax+b. An inherent deviation is obtained at a specific temperature (e.g., room temperature) and is used to compare the current values by compensating a deviation of the resistance value of the shunt resistor according to the temperature at the time of detection of the current. The deviation of the resistance value of the shunt resistor can be compensated to measure the current value more precisely. Such a self error compensation is performed by a y axis compensation, and a slope deviation needs to be compensated to perform a more precise compensation. Resistance values R1 and R2 are measured at specific temperatures t1 and t2 to find and compensate a slope deviation, so that a more precise resistance value can be obtained at the maximum and minimum temperatures compared to the y axis compensation method. The compensated data is utilized in the change in the current value according to the temperature to contribute to the accurate measurement of the current value. That is, when the temperature coefficient compensation is performed at two different temperatures, the current can be measured more precisely.

Meanwhile, a value of the surrounding temperature used at the time of compensation of the current measured by the shunt resistor is measured by the surrounding state monitoring module 120. The surrounding state monitoring module 120 performs a function of monitoring the surrounding state besides the measurement of the surrounding temperature.

More specifically, the surrounding state monitoring module 120 performs a state monitoring function in order to correctly carry out the switching on/off operation of a switch. To this end, the surrounding state monitoring module monitors the supply voltage of the battery, the surrounding temperature, and the control input signal. The surrounding state monitoring module ensures a correct switching operation through a power monitoring function of monitoring the power voltage of the battery and the voltage of the constant voltage circuit and a function of monitoring whether the range of the control input signal is within a predetermined range. For example, if the power voltage of the battery and the voltage of the constant voltage circuit are correctly not inputted to the switching control unit, the output of the constant voltage from the constant voltage circuit is cut off through the enable terminal of the switching control unit 100 to prevent an erroneous operation. The surrounding state monitoring module monitors whether or not a control input signal of a proper range is inputted to the switching control unit depending on each input mode.

In the meantime, the input and output monitoring module 130 monitors whether a difference between the control input signal and the load output signal is within a normal range and provides the difference to the switching control unit. If the control input signal is inputted in the form of a PWM or DC signal to the switching control unit, it is supplied to a comparator 131 via level shifter 132. The comparator 131 receives a control input signal which is level-shifted and a load output signal which is not level-shifted, compares the levels and timings of the two signals, and provides a result of the comparison to the switching control unit 200. Then, the switching control unit 200 can determine whether the control input signal is normal by receiving a signal indicating the result of the comparison. As a result of the determination, if a comparison value is not within the predetermined range, the switching control unit determines this to be an error situation and outputs an error signal to control the output of the load output signal. For example, the switching control unit confirms whether or not the load output signal is outputted normally by again outputting a load output signal of 12V.

The embodiments as described above are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

INDUSTRIAL APPLICABILITY

The switch relay device according to the present invention can be variously applied to an industrial field in which a variety kinds of electronic devices are installed which requires the function of an electronic relay besides vehicles.

The invention claimed is:
1. A switch relay device comprising:
a switching control unit for determining a duty value depending on the kind of a control input signal inputted thereto and generating a first switching control signal and a second switching control signal whose phases are opposite to each other;

a switching drive signal generation unit for generating a switching drive signal through R-C charge and discharge in response to the first switching control signal and the second switching control signal applied thereto from the switching control unit;
a load output signal generation unit for receiving the switching drive signal from the switching drive signal generation unit and outputting a load output signal; and
a constant voltage unit connected to a battery disposed in a vehicle to supply power to the switching drive signal generation unit and the load output signal generation unit and configured to provide a constant voltage to the switching control unit.

2. The switch relay device according to claim 1, wherein the load output signal generation unit is implemented as a first FET as a FET device, the first FET comprising a drain for receiving a power voltage from the battery, a gate for receiving a switching drive signal from the switching drive signal generation unit, and a source for outputting the load output signal to a load.

3. The switch relay device according to claim 2, wherein the control input signal inputted to the switching control unit is any one of a DC signal, a PWM signal, a high signal, and no signal, and the switching control unit generates the first switching control signal and the second switching control signal whose phases are opposite to each other depending on the input control signal inputted thereto.

4. The switch relay device according to claim 3, wherein the switching control unit separately generates a third switching control signal in the form of a PWM signal, the third switching control signal having a duty value fixed irrespective of the control input signal.

5. The switch relay device according to claim 3, wherein if the switching control unit receives a DC control input signal, it generates a second switching control signal in the form of PWM of a positive phase having a duty value in proportional to a level value of the DC signal, and a first switching control signal in the form of PWM of a negative phase having a duty value in proportional to a level value of the DC signal.

6. The switch relay device according to claim 3, wherein if the switching control unit receives a PWM control input signal, it generates a second switching control signal in the form of PWM of a positive phase having the same duty value as that of the PWM signal, and a first switching control signal in the form of PWM of a negative phase with respect to the PWM signal.

7. The switch relay device according to claim 3, wherein if the switching control unit receives a high control input signal, it generates a second switching control signal having a high value of "1" and a first switching control signal having a low value of "0".

8. The switch relay device according to claim 3, wherein in case of a 'no signal' state where no control input signal is inputted to the switching control unit for a given time period, the switching control unit performs a switching operation in which between the constant voltage unit 400 and the switching control unit 100 is opened to cause the operation of the constant voltage unit to be stopped.

9. The switch relay device according to claim 4, wherein the switching drive signal generation unit comprises:
a first charge and discharge module for receiving the power voltage from the battery, the first charge and discharge module being an integration circuit consisting of a first resistor R1 and a first capacitor C1;
a first diode D disposed between the first charge and discharge module and the battery;
a first switch for switching on/off whether to discharge the switching drive signal inputted to the gate of the first FET in response to the first switching control signal inputted thereto from the switching control unit;
a second switch for receiving a second switching control signal having a phase opposite to that of the first switching control signal from the switching control unit and performing a switching on/off operation in the opposite manner to that of the first switch in response to the second switching control signal; and
a load output drive signal on/off module for adjusting a time constant of the first charge and discharge module to control the output of the first FET of the load output signal generation unit.

10. The switch relay device according to claim 9, wherein the load output drive signal on/off module comprises:
a second FET comprising a source that is connected to the source of the first FET, a gate that receives the third switching control signal from the switching control unit, and a drain that is connected to the other end of the first charge and discharge module; and
a third FET comprising a drain that is connected to a node between the other end of the first charge and discharge module and the drain of the second FET, a gate that receives the third switching control signal from the switching control unit, and a source that is connected to a ground.

11. The switch relay device according to claim 9, wherein the switching drive signal generation unit further comprises:
a second charge and discharge module implemented as an integration circuit that is connected at one end thereof to a node between the first diode D1 and the first charge and discharge module and is connected at the other end thereof to the gate of the first FET, and consists of a second resistor R2 and a second capacitor C2 that are connected in parallel with each other; and
a fifth diode that is disposed between the node between the first charge and discharge module and the first diode D1 and the gate of the first FET Q1, the fifth diode having an anode connected to the node between the first diode and the first charge and discharge module and a cathode connected to the second charge and discharge module,
wherein the load output drive signal on/off module adjusts a time constant of the second charge and discharge module along with the adjustment of the time constant of the first charge and discharge module to control the output of the first FET of the load output signal generation unit.

12. The switch relay device according to claim 2, further comprising:
an overcurrent monitoring module for monitoring a voltage to be applied to the switching control unit, and detecting whether or not an overcurrent exceeding a predetermined range flows into the switching control unit;
a surrounding state monitoring module for monitoring the supply voltage of the battery, the surrounding temperature, and the control input signal; and
an input and output monitoring module for monitoring whether a difference between the control input signal and the load output signal is within a normal range.

13. The switch relay device according to claim 12, wherein the overcurrent monitoring module comprises:
a shunt resistor disposed between the drain as an input terminal of the first FET and the battery;

a current detector for detecting a current flowing in the shunt resistor; and a low pass filter for filtering the current detected by the current detector and providing the filtered current to the switching control unit.

14. The switch relay device according to claim 13, wherein the current detector compensates a value of the current detected by the shunt resistor using the measured surrounding temperature.

15. The switch relay device according to claim 13, wherein the low pass filter comprises:

a first low pass filter having a predetermined maximum current value as a first filtering reference value; and a second low pass filter having a predetermined overcurrent value as a second filtering reference value.

16. The switch relay device according to claim 15, wherein if a value of the current detected by the current detector is a current value exceeding the first filtering reference value and the second filtering reference value, the switching control unit generates the first switching control signal and the second switching control signal as error pulse signals to output them.

* * * * *